(12) United States Patent
Towers et al.

(10) Patent No.: US 10,161,750 B2
(45) Date of Patent: Dec. 25, 2018

(54) ION SOURCE ALIGNMENT

(71) Applicant: Micromass UK Limited, Wilmslow (GB)

(72) Inventors: Mark Towers, Stockport (GB); Paul Murray, Manchester (GB)

(73) Assignee: MICROMASS UK LIMITED, Wilmslow (GB)

(*) Notice: Subject to any disclaimer, the term of this patent is extended or adjusted under 35 U.S.C. 154(b) by 0 days.

(21) Appl. No.: 15/267,677

(22) Filed: Sep. 16, 2016

(65) Prior Publication Data
US 2017/0082435 A1 Mar. 23, 2017

(30) Foreign Application Priority Data

Sep. 18, 2015 (GB) ..................... 1516543

(51) Int. Cl.
| | | |
|---|---|---|
| G01C 15/00 | (2006.01) | |
| H01J 49/00 | (2006.01) | |
| H01J 49/02 | (2006.01) | |
| H01J 49/14 | (2006.01) | |
| H01J 49/16 | (2006.01) | |
| H01J 49/04 | (2006.01) | |

(52) U.S. Cl.
CPC ........ G01C 15/004 (2013.01); H01J 49/0031 (2013.01); H01J 49/025 (2013.01); H01J 49/0409 (2013.01); H01J 49/145 (2013.01); H01J 49/165 (2013.01); *H01J 49/0404* (2013.01)

(58) Field of Classification Search
CPC .... H01J 49/00; H01J 49/0009; H01J 49/0027; H01J 49/0031; H01J 49/02; H01J 49/04; H01J 49/0404; H01J 49/0409; H01J 49/0413; H01J 49/10; H01J 49/107; H01J 49/26
USPC ................................ 250/281, 282, 283, 288
See application file for complete search history.

(56) References Cited

U.S. PATENT DOCUMENTS

| | | | |
|---|---|---|---|
| 7,550,720 B2 | 6/2009 | Overney | |
| 7,586,091 B2 | 9/2009 | Takahashi et al. | |
| 2004/0217273 A1* | 11/2004 | Bai | H01J 49/164 250/282 |
| 2006/0273808 A1* | 12/2006 | Van Berkel | H01J 49/0004 324/754.04 |
| 2006/0284079 A1* | 12/2006 | Overney | H01J 49/0418 250/288 |
| 2007/0181826 A1* | 8/2007 | Bunton | G01N 23/22 250/491.1 |
| 2010/0200742 A1* | 8/2010 | Schultz | H01J 49/0045 250/252.1 |
| 2010/0320374 A1 | 12/2010 | Jarrell et al. | |
| 2011/0198496 A1* | 8/2011 | Ikegami | H01J 49/0004 250/288 |

(Continued)

*Primary Examiner* — Jason McCormack
(74) *Attorney, Agent, or Firm* — Womble Bond Dickinson (US) LLP; Deborah M. Vernon; Heath T. Misley

(57) ABSTRACT

An ion analysis instrument is disclosed comprising an indicator device for providing an indication of a relative positioning of an ion source, a sample, and/or a sampling orifice or capillary of an ion analysis instrument such as a mass or ion mobility spectrometer in order to facilitate re-alignment of one or more of these components following a change. The indicator device comprises a source of electromagnetic radiation such as a pair of lasers or image projection devices.

14 Claims, 2 Drawing Sheets

(56) References Cited

U.S. PATENT DOCUMENTS

2012/0248303 A1* 10/2012 Hiraoka ............. G01N 30/7266
250/282

* cited by examiner

ION SOURCE ALIGNMENT

CROSS-REFERENCE TO RELATED APPLICATION

This application claims priority from and the benefit of United Kingdom Patent Application No. 1516543.4 filed on 18 Sep. 2015. The entire contents of this application are incorporated herein by reference.

FIELD OF THE INVENTION

The present invention relates generally to ion analysis such as mass and ion mobility spectrometry and in particular to ion analysis instruments and methods of ion analysis.

BACKGROUND

Mass and ion mobility spectrometers require that a sample is ionised prior to its introduction into and analysis by the analyser of the instrument. Various types of ionisation sources are known for providing analyte ions to such ion analysis instruments. In particular, there are a number of known ionisation sources that operate under ambient or atmospheric pressure conditions such that a sample can be introduced and ionised with minimal pre-processing or separation. Typically, in these types of ambient ionisation sources, a sample is provided on a sample plate and an ionising beam (e.g. an electrospray beam or a laser) is then directed onto the sample plate i.e. onto the surface of the sample in order to generate ions. The ions generated in the atmospheric pressure ion source region are then passed via a sampling orifice or capillary to an analyser housed within a vacuum chamber.

It is desired to provide an improved ion analysis instrument.

SUMMARY

According to an aspect there is provided an ion analysis instrument comprising:

an ion source for generating ions from a sample;

a sampling orifice or capillary for receiving ions generated by the ion source through which ions pass, in use, towards an analyser; and an indicator device comprising one or more sources of electromagnetic radiation for providing an indication of a relative positioning of the ion source and/or the sample and/or the sampling orifice or capillary.

To ensure that a sufficient number of analyte ions can be generated from the sample and be provided to the analyser, it is important that the sampling orifice, the ion source and the sample are correctly positioned relative to one another. The relative positions of these components may thus be substantially optimised during the initial experimental or instrument set-up. At times however, it may be desired to change the sample or to change, adjust or remove part of the ion source and/or sampling orifice. The process of changing a sample, fitting the ion source and/or fitting the appropriate sampling orifice may potentially result in a misalignment of these components and may require a re-optimisation of their relative positions.

The techniques described herein provide an indicator device comprising one or more sources of electromagnetic radiation for providing an indication of a relative positioning of or between the ion source, the sample and/or the sampling orifice thus facilitating a rapid and precise (re-)alignment of these components following a change or adjustment. The indication provides a reference for aligning the ion source/interface components of the ion analysis instrument. Thus, the indication may be an aid or guide that facilitates alignment of the ion source, sample and/or sampling orifice or capillary.

The indicator device may provide a visual (i.e. visible) indication of the relative positioning. The indicator device may thus comprise one or more light sources. The indication may thus serve as a visual aid or guide to allow the components to be rapidly arranged in a desired position. For example, the indication may comprise a spot, a series of spots, a crosshair or any other suitable distinctive mark provided on the surface of the sample indicating the point to which an ionisation device of the ion source and/or sampling orifice is or should be directed. It will be understood that a visual indication is one that is visible (in use) to the human eye. For instance, the indication may comprise electromagnetic radiation with a wavelength within the range of about 390 to 700 nm. The device for providing an indication may thus comprise an optical device wherein the one or more sources of radiation provide an optical indication.

It is also contemplated however that the indication may be non-visible, e.g. may comprise infra-red or ultraviolet radiation. For example, in this case, a suitable detector may be provided for detecting the indication.

The instrument and/or the indicator device may further comprise various optical components for directing and/or focussing the radiation emitted from the source of radiation.

Conventionally, a user has to manually re-adjust the positions of these components each time they are changed (or otherwise become misaligned) which can be a relatively time-consuming and laborious process. Sample may be lost or become contaminated during the time taken to correctly position these components. Furthermore, an incorrect alignment may reduce the sensitivity of the instrument and an incorrect or different alignment between separate experiments may introduce artifacts or errors into the acquired data that cannot readily be accounted for.

The techniques described herein simplify the process of re-aligning the components in an ion source region (e.g. the components of an ambient ion source) after a change has been made. For instance, the techniques described herein may provide a greater degree of confidence in the alignment or allow the alignment to be performed more rapidly.

WO 2009/070555 (WATERS TECHNOLOGIES CORPORATION) discloses an arrangement where an inlet housing of a mass spectrometer is rotatable between two discrete positions in order to vary the angle between a passage of the sampling orifice and the wall on which the housing is mounted. A simple physical mark may be provided on the wall mounting that cooperates with corresponding indicia on the wall to allow the inlet housing to be set into a first or second fixed position, US 2006/0214101 (TAKAHASHI) discloses an arrangement wherein alignment marks may be provided on a microchip in order to increase the alignment accuracy of light irradiation directed onto a particular channel of a microchip. There is no disclosure in these documents of an indicator device that provides a more general indication of the relative positioning between various components that may help simplify the process of re-aligning the components in the ion source region.

Furthermore, in WO 2009/070555 (WATERS TECHNOLOGIES CORPORATION) and US 2006/0214101 (TAKAHASHI), relatively simple physical marks are provided to help set the inlet housing/microchip into position. Because these marks are fixed in place they only allow an indication of certain, discrete positions. Such physical marks are also liable to rub off or otherwise become obscured over time and may be difficult to use accurately. By contrast, using an indicator device comprising one or more sources of electromagnetic radiation may provide a more accurate and/or easier to use indicator allowing more confidence in the alignment. Furthermore, according to the techniques described herein it may be possible to adjust the indicator device in order to indicate different desired relative positionings. This would not be possible using the fixed physical marks described in WO 2009/070555, for instance.

The indicated relative positioning of the ion source and/or sample and/or sampling orifice may be a desired or pre-determined relative positioning. That is, the indicator device may be set or otherwise arranged so as to provide an indication of when a desired or pre-determined relative positioning is achieved. The components may then be adjusted until such indication is provided or alignment is achieved.

A desired relative positioning may have been determined based on a previous or initial optimisation. Having initially optimised the relative positions of the sampling orifice with the ion source and/or the sample, the indication can then be set to define these positions. The indication may thus allow the various components to be rapidly returned to a pre-determined desired positioning without having to repeat the initial optimisation or calibration. Similarly, the desired positioning may be a desired relative positioning of the ion source, the sample and/or the sampling orifice. For instance, it may indicate a desired positioning of the ion source or one or more components of the ion source relative to the sample and/or relative to the sampling orifice. Alternatively, or additionally, it may indicate a desired positioning of the sample relative to the sampling orifice.

The desired positioning may be determined in part by the relative positions of the components in use. For instance, the desired position of the ion source relative to a surface of the sample may be defined by the current position of the sampling orifice relative to the sample (or vice versa). Thus, if the ion source, or an ionisation device thereof, is moved to a different region on the surface of a sample, an indication may be provided of the region on the surface of a sample to which the ion source is now directed and the position of the sampling orifice or capillary may then be adjusted based on this indication to point to the same region on the surface of the sample to ensure that ions generated from that region are sufficiently sampled. Alternatively, or additionally, the desired positioning of the ion source and/or sampling capillary on the surface of the sample may be determined by a further reference indication not associated with either the ion source or sampling capillary. The positions of the sampling orifice and ion source may then be adjusted to bring them into alignment with the reference indication.

The indicator device may provide an indication of a relative positioning of any or all of the ion source, the sample and the sampling orifice or capillary. Generally, the indication will be an indication of a relative positioning between two or more of these components, i.e. between the ion source and the sample, between the ion source and the sampling orifice or capillary, or between the sampling orifice or capillary and the sample. However, the indication may also indicate a positioning of the sample, ion source and/or sampling orifice relative to any other components of the ion analysis instrument or relative to any other indicators or markers, including e.g. one or more fixed reference points.

Typically, an indication may be provided for each pair of components that are to be aligned e.g. there may be device for providing an indication of a relative positioning of the ion source relative to the sample and a further device for providing an indication of a relative positioning of the sampling capillary relative to the sample. That is, one or more or a plurality of indications may be provided. There may be a plurality of devices for providing such plurality of indications. However, it will also be appreciated that single device, or a single indication, may serve to indicate a relative positioning of multiple different components. The one or more devices for providing the indication may be fixed in position relative to their associated component e.g. relative to the on source and/or sampling capillary. The device for providing an indication may generally be associated with or mounted on either the ion source assembly or the ion analysis instrument as appropriate.

The sampling orifice provides an inlet into the ion analysis region of the ion analysis instrument. The sampling orifice may comprise a sampling capillary. The sampling orifice may, however, also comprise various other suitable inlets such as a sampling or skimmer cone, a funnel, or an aperture. Typically, ions generated from a sample by the ion source will be received directly by the sampling orifice. For instance, where the sampling orifice comprises a sampling capillary, the capillary will be positioned above the sample so as to receive ions generated from the surface of the sample. The sampling orifice thus provides an interface between the ion source region and the ion analysis region. Ions generated by the ion source will generally be passed through the sampling orifice into one or more vacuum stages of the ion analysis instrument before arriving at the analyser or ion analysis region.

It will be appreciated that the techniques described herein may generally be applied to any suitable ion analysis instrument requiring a careful arrangement of the sample and/or ion source and/or sampling orifice. In particular, it is envisaged the techniques may be applied in the context of mass spectrometry and/or ion mobility spectrometry. That is, the ion analysis instrument may be a mass spectrometer and/or ion mobility spectrometer. Accordingly, there may be provided a mass spectrometer and/or ion mobility spectrometer comprising an ion source for generating ions from a sample; a sampling orifice for receiving ions generated by the ion source through which ions pass, in use, towards a mass analyser and/or ion mobility analyser; and an indicator device for indicating a relative positioning of the ion source and/or the sample and/or the sampling orifice. In such instruments, any or each of the sample, sampling orifice and ion source may be changed or re-fitted e.g. between experiments so that the positions of any or all of these components may be adjustable. However, it will also be appreciated that one or more of these components may be fixed in place. For instance, the sampling orifice, being part of the ion analyser instrument, may be fixed with only the positions of the sample and/or ion source relative to the sampling orifice being adjustable.

The indicator device may comprise one or more lasers or one or more pairs or groups of lasers and/or one or more image projection devices.

In this case, a desired or pre-determined relative positioning between any two components may e.g. be indicated by a point of focus and/or a point of intersection of the lasers or image projection devices.

For example, the indicator (or optical indicator) device may comprise one or more lasers or one or more pairs or groups of lasers. The device for providing an indication may comprise a number of (independent) pairs of lasers, with each pair of lasers arranged so as to provide one or more indications of a desired relative positioning of one or more of the components. For example, an indication may be provided by the distance between two laser spots or by a crosshair formed by two laser lines. Thus, the optical device may comprise a pair of laser point sources and/or a pair of laser line sources. The pairs of lasers may be arranged to indicate or define the relative positions of the ion source, sample and/or sampling orifice. In particular, the pairs of lasers may be arranged such that a desired relative position of the ion source, sample and/or sampling orifice is indicated. For example, the pairs of lasers may provide a visual aid for aligning the components into a desired relative position.

As another example, the indicator (or optical indicator) device may comprise an image projection device. The image projection device may be arranged to project one or more indications, e.g. lines or spots in a similar manner described above. For instance, a cross hair may be formed by two projected lines.

Using one or more indicator (or optical indicator) devices, such as one or more lasers or image projection devices, to provide a visual indication allows a user to rapidly, manually adjust the positioning of the various components into a desired position.

It will be appreciated that the power of the optical device may be selected so as to not substantially interfere with the sample. Typically, the optical device, i.e. the lasers or image projectors may be turned OFF during an experimental run.

The indicator device may comprise a device for indicating a height of the sample relative to the sampling orifice or capillary and/or relative to the ion source.

The indicator device may comprise a device for indicating a positioning or alignment of the ion source relative to the sample and/or relative to the sampling orifice or capillary. The indicator device may comprise for indicating a positioning or alignment of the sampling orifice or capillary relative to the sample.

It will be appreciated that a single device, e.g. a single pair of lasers, may provide an indication of both a height and also of an orientation of a particular component. Generally, as mentioned above, a plurality of indications will be provided in order to indicate the positioning or desired positioning of a plurality of components. The device for providing an indication may thus comprise a first device that provides a first indication of a height of the sample relative to the sampling orifice. The first device or first indication may additionally indicate the position or orientation of the sampling orifice relative to the surface of the sample. The device for providing an indication may further comprise a second device that provides a second indication of the position or orientation of ion source relative to the surface of the sample i.e. on the surface of the sample. The second device may optionally also provide an indication of a height of the sample relative to the ion source.

These indications may also be used to determine a desired relative position between the ion source and the sampling orifice e.g. such that they are both directed towards the same point on the surface of the sample. The indication of the position or alignment of the ionisation device relative to the sample and the indication of the position or alignment of the sampling orifice relative to the sample may thus be aligned with one another (and/or e.g. with a further reference indication).

By way of example, the device for indicating a height of the sample (i.e. of a surface of the sample or of a sample holder or plate) relative to the sampling orifice or capillary and/or ion source or ionisation device may comprise two point source lasers. The two point source lasers will provide two spots on the surface of the sample. The point of intersection of the beams of the point source lasers (i.e. where the two spots align) may be set to indicate the desired height.

Similarly, where a laser beam is focussed onto the sample to provide the indication, the laser spot size may be used to indicate the correct focussing and hence the correct height of the sample relative to the sampling orifice or capillary and/or ion source.

Two point source lasers may also be used to indicate a positioning or alignment (of e.g. the sampling orifice) relative to the sample surface. For instance, by arranging the lasers in the same plane as a sampling capillary, the point of intersection will also indicate the point on the sample surface to which the sampling capillary is directed.

As another example, the device for indicating a positioning or alignment (e.g. of the ionisation device relative to the sample and/or relative to the sampling orifice) may comprise two line source lasers arranged to provide a crosshair on the surface of the sample. The crosshair may indicate the point on the surface of the sample to which the ionisation device is directed.

The point of intersection indicating the point on the sample surface to which the sampling capillary is directed towards and the crosshair indicating the point on the surface of the sample to which the ionisation device or sampling orifice or capillary is directed towards can then be aligned with one another (e.g. by moving the ionisation device and/or sample and/or sampling capillary) such that the sampling capillary and ion source are directed towards the same point of the surface of the sample.

As a further example, where an image projection device is used, the degree of focus of the projected image(s) may be used to provide an indication of the height or the sample relative to the sampling orifice and/or the ion source. For instance, the image projection device may be configured such that the image is correctly focussed when the sample is positioned at the correct i.e. a predetermined desired height.

Any combination of the above indications and indeed other suitable indications may be provided in respect of any of the components described above. For instance, point source lasers may also be used to indicate the positioning of the sampling capillary and/or line source lasers may also be used to indicate the positioning of the ion source or ionisation device.

At least one of the ion source, the sample and the sampling orifice or capillary may be replaceable and/or adjustable between a range of positions in use, and the indicator device may be arranged to provide an indication of a desired or pre-determined relative positioning of the ion source and/or the sample and/or the sampling orifice or capillary.

That is, the indicator device may be set or configured such that when one or more components are in a desired or pre-determined relative position, a suitable indication of this 'correct' alignment is provided. When the components are not in the desired or pre-determined relative position the indication may indicate this, and may e.g. indicate in what sense the components should be adjusted to achieve the desired or pre-determined relative position.

At least one of the ion source, the sample and the sampling orifice or capillary, and optionally all of them, may be adjustable between a substantially continuous range of positions. That is, the position(s) of the component(s), and hence the relative positions, may be incrementally adjusted.

The instrument may further comprise a device for detecting the indication and control circuitry for automatically adjusting the position of the sample and/or the ion source based on the indication.

The device for detecting the indication may comprise a camera. However, it will be appreciated that the indication need not necessarily be a visual indication, in which case other devices for detecting the indication may be used. For example, the indication may comprise non-visible (e.g. infra-red) radiation which may then be detected using a suitable non-visible detector. The control system may comprise a device for automatically adjusting the position comprising one or more motorized actuator devices and optionally a feedback loop. That is, the instrument may comprise feedback circuitry for automatically bringing the components into alignment The ion source may comprise an ionising beam which is directed, in use, onto the sample in order to generate ions.

The impact or other interaction of the ionising beam with the sample may act to generate ions. For example, the ion source may comprise an ionisation device selected from the group consisting of: (i) an electrospray emitter; (ii) a plasma torch; (iii) a focussed laser beam; and (iv) a jet of fluid. It will be appreciated that in cases where the ion source comprises a laser beam, this is typically a different laser beam to that of the indicator device (where the indicator device comprises one or more lasers).

The ion source may comprise an ambient or atmospheric pressure ion source.

It will be understood that an ambient or atmospheric pressure ion source is one that may be operated under ambient pressure conditions i.e. does not require dedicated vacuum pumping. That is, ions are generated outside of the vacuum regions of the ion analysis instrument, typically without significant pre-processing or separation of the sample. Various types of ambient ionisation source are known in the art. The sample may be provided on a sample plate as discussed above.

It will be appreciated that in the context of an ambient ion source, there may be an increased risk of introducing a misalignment between the sample, ion source and sampling orifice during use as each of these components is housed outside of the vacuum regions of the instrument and is thus more accessible to a user e.g. compared to a vacuum ion source (where the ion source and any orifices are located within the vacuum region). The techniques described herein may therefore be particularly suitable for use in the context of ambient or atmospheric pressure ionisation.

The ion source may comprise a desorption electrospray ionisation ("DEBI") source, a laser-assisted electrospray ionisation ("LAESI") source, an inductively coupled plasma ("ICP") source, a Direct Analysis in Real Time ("DART") ionisation source, a laser desorption ionisation ("LDI") source, a matrix-assisted laser desorption ionisation ("MALDI") source or a Dielectric Barrier Discharge ion source.

The ion source may comprise: a sample holder or plate for receiving a sample; and an ionisation device for generating ions from the sample.

The device for providing an indication may thus provide an indication of the relative positioning of the sample holder or plate, the ionisation device and/or the sampling capillary.

The sample may have a surface with which the ionisation device impacts on or otherwise interacts with, in use, to generate ions. The sample may be provided on a surface e.g. of a sample holder or plate in which case, the surface of the sample may effectively be defined by (i.e. or coplanar with) the surface of the sample holder or plate. Generally, it is the position of the surface of the sample with which the ionisation device interacts with relative to the ionisation device and/or sampling capillary that is important. It will also be appreciated that where a sample is provided on a sample plate, the sample will be provided on the upper, planar surface thereof and the position of this surface relative to the ionisation device and/or sampling capillary may be important. Thus, any reference herein to positioning of a sample may be understood as referring to a positioning of a surface of the sample, or of the sample holder or plate, where one is provided.

In particular, it will be appreciated that an initial determination or optimisation of the position may be performed using the sample holder or plate (rather than a particular sample per se). For instance, the indicated positioning of the sample may be a height or desired height of the sample holder or plate relative to the sampling orifice and/or ionisation device. Particularly, the indicated positioning may comprise a height of the planar surface of the sample plate upon which the sample is provided.

The ionisation device may comprise any suitable device for impacting on or interacting with a surface of the sample to generate ions. Generally, the ionisation device may provide an ionising beam or spray of energy and/or particles. The ionisation device or particularly the ionising beam provided thereby may thus be directed or oriented towards or aligned with a desired point on the surface of the sample. For example, the ionisation device may comprise an electrospray emitter (i.e. sprayer). Alternatively, or additionally, the ionisation device may comprise a focussed laser beam, a jet of fluid or a plasma torch. The provided indication(s) may thus alternatively, or typically additionally, comprise an indication of the point on the surface of the sample (i.e. on the surface of the sample holder or plate) with which the ionisation device impacts on or interacts with, i.e. the impact location of the ionisation device. Similarly, by providing an indication of the point on the surface of the sample to which the ionisation device is directed, it is possible to then ensure that the sampling orifice or capillary is directed towards the same point (or vice versa).

However, it will be appreciated that the techniques described herein may also generally be applied to other sample or ion source configurations than those described above, and these are also contemplated herein. For example, the techniques described herein may also find application where the sample is provided from an ion source as a stream of ions, in which case the direction or orientation of the stream of ions may need to be positioned correctly relative to the sampling orifice and an indication of this may be provided.

An indication may be provided to indicate a point on the sample surface to which the sampling capillary is or should be directed. The indication may additionally or alternatively indicate a height or desired height of the sampling capillary inlet relative to the sample surface.

According to another aspect there is provided a method of aligning one or more components of an ion analysis instrument comprising:

providing an instrument substantially as described herein;

adjusting the position of one or more of the ion source, the sample and the sampling orifice or capillary until the indicator device indicates a desired or pre-determined relative positioning.

According to another aspect there is provided a method of ion analysis comprising: providing a sample, an ion source for generating ions from the sample and a sampling orifice or capillary for receiving ions generated by the ion source through which ions pass, in use, towards an analyser;

providing by an indicator device comprising one or more sources of electromagnetic radiation an indication of a relative positioning of the sample and/or the ion source and/or the sampling orifice or capillary; and adjusting the position of the sample and/or the ion source and/or the sampling orifice based on the indication.

The techniques described herein generally provide a method of arranging or positioning components within an ion analysis instrument such as a mass spectrometer or ion mobility spectrometer. The method of ion analysis may generally further comprise, once the components have been adjusted to a desired position: generating ions from the sample using the ion source; receiving the ions through the sampling orifice and passing the ions towards an analyser; and analysing the ions.

As described above, the desired positioning may be pre-determined based on an initial optimisation routine. The sample, ion source and/or sampling orifice may subsequently be changed in use, or installed, and their positions re-adjusted based on the provided indication.

Thus, the method may further comprise, optionally prior to the step of providing the sample, ion source and sampling orifice or capillary: determining a desired positioning of the sample, the ion source and/or the sampling orifice or capillary; and generating an indication reflective of the desired or pre-determined positioning.

According to the techniques described herein the steps of determining and generating the indication of the desired positioning need not, and typically will not, be performed multiple times or multiple times in an experimental cycle. Typically, as described above, the desired positioning will be determined during an initial optimisation process and the indication generated based on this determination. The indication may then be stored and subsequently used to aid the user in restoring the components to the desired positioning after e.g. a change in sample, ion source or sampling orifice. It will be understood that the steps of determining the desired positioning and generating the indication need not be performed by the end user and may be based on optimisation provided elsewhere e.g. by the manufacturer. The desired positioning may generally be optimised for particular arrangements of ion sources and/or sampling orifices, with each particular arrangement having an associated desired positioning.

The step of adjusting the position of the sample and/or the device for generating ions and/or the sampling orifice or capillary may comprise:

(i) adjusting a height of the sample relative to the ion source and/or the sampling orifice or capillary; and/or (ii) adjusting an orientation or alignment of the ion source and/or the sampling orifice relative to a surface of the sample.

The indication may comprise a visual indication provided by one or more pairs of lasers or image projection devices.

The method according to this aspect may further comprise any or all of the features described above in relation to the first aspect.

From another aspect there is provided a mass spectrometer comprising:

an ambient or atmospheric pressure ion source comprising a sample plate for receiving a sample and an ionisation device for providing an ionising beam that is directed, in use, towards the sample in order to generate ions from the sample;

a sampling orifice or capillary for receiving ions generated by the ion source through which ions pass, in use, towards a mass analyser; and an indicator device comprising one or more sources of electromagnetic radiation for providing an indication of a relative positioning of the ionisation device and/or the sample or sample plate and/or the sampling orifice or capillary.

The ionisation device may comprise an electrospray emitter.

The mass spectrometer may further comprise:

a first device for providing a first indication of a relative positioning of the ionisation device and the sample or sample plate; and a second device for providing a second indication of a relative positioning of the sampling orifice or capillary and the sample or sample plate.

The first device and the second device may each comprise a pair of point line source lasers.

The first indication may indicate the impact location of the ionisation device and the second indication may indicate a height of the sampling capillary above the sample or sample plate and/or the point on the sample or sample plate to which the sampling orifice or capillary is directed.

According to another aspect there is provided a method of mass spectrometry comprising:

using an ambient or atmospheric pressure ion source to generate ions from a sample provided on a sample plate;

passing ions generated by said ion source through a sampling orifice or capillary towards a mass analyser; and providing by an indicator device comprising one or more sources of electromagnetic radiation an indication of a relative positioning of the ion source and/or the sample or sample plate and/or the sampling orifice or capillary.

The mass spectrometer of this aspect may include any or all of the features described above in relation to any of the other aspects at least to the extent that they are not mutually incompatible.

It will be appreciated that the use of e.g. two laser line generators to create an illuminated crosshair to determine the impact location of an ionising spray (e.g. from an electrospray emitter) enables a visual guide to positioning the sample relative to the sprayer. Combining this with another pair of lasers that intersect on the sample plate at the optimum height of the sample relative to the sampling capillary of the e.g. mass spectrometer enables a visual guide to positioning both the sample and the spray relative to the sampling capillary.

According to a further aspect there is provided an ion analysis instrument comprising:

an ion source for generating ions from a sample;

a sampling orifice or capillary for receiving ions generated by the ion source through which ions pass, in use, towards an analyser; and an indicator device for providing an indication of a relative positioning of the ion source and/or the sample and/or the sampling orifice or capillary.

According to another aspect there is provided a method of on analysis comprising:

providing a sample, an ion source for generating ions from the sample and a sampling orifice or capillary for receiving ions generated by the ion source through which ions pass, in use, towards an analyser;

providing an indication of a relative positioning of the sample, the ion source and/or the sampling orifice or capillary; and adjusting the position of the sample and/or the ion source and/or the sampling orifice or capillary based on the indication.

According to another aspect there is provided a mass spectrometer comprising:

an ambient or atmospheric pressure ion source comprising a sample plate for receiving a sample and an ionisation device for generating ions from the sample;

a sampling orifice or capillary for receiving ions generated by the ion source through which ions pass, in use, towards a mass analyser; and a device for providing an indication of a relative positioning of the ionisation device and/or the sample or sample plate and/or the sampling orifice or capillary.

According to another aspect there is provided a method of mass spectrometry comprising:

using an ambient or atmospheric pressure ion source to generate ions from a sample provide on a sample plate;

passing ions generated by the ion source through a sampling orifice or capillary towards a mass analyser; and providing an indication of a relative positioning of the ion source and/or the sample or sample plate and/or the sampling orifice or capillary.

According to an embodiment the installment or mass spectrometer may comprise: (a) an ion source selected from the group consisting of: (i) an Electrospray ionisation ("ESI") ion source; (ii) an Atmospheric Pressure Photo Ionisation ("APPI") on source; (iii) an Atmospheric Pressure Chemical ionisation ("APCI") ion source; (iv) a Matrix Assisted Laser Desorption ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma) ("ICP") ion source; (xiii) a Fast Atom Bombardment ("FAB") ion source; (xiv) a Liquid Secondary ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an impactor ion source; (xxii) a Direct Analysis in Real Time ("DART") ion source; (xxiii) a Laserspray Ionisation ("LSI") ion source; (xxiv) a Sonicspray ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage optionally has an amplitude selected from the group consisting of (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) >about 500 V peak to peak.

The AC or RF voltage may have a frequency selected from the group consisting of: (i) <about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

According to an embodiment analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

According to an embodiment in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

The multiply charged analyte cations or positively charged ions may comprise peptides, polypeptides, proteins or biomolecules.

According to an embodiment in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

According to an embodiment the process of Electron Transfer Dissociation fragmentation comprises interacting analyte ions with reagent ions, wherein the reagent ions comprise dicyanobenzene, 4-nitrotoluene or azulene.

A chromatography detector may be provided wherein the chromatography detector comprises either:

a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photaionization Detector (PD); (vii) a Refractive Index Detector (RID); (viii) a radio flow detector; and (ix) a chiral detector.

The mass spectrometer may be operated in various modes of operation including a mass spectrometry ("MS") mode of operation, a tandem mass spectrometry ("MS/MS") mode of operation, a mode of operation in which parent or precursor ions are alternatively fragmented or reacted so as to produce fragment or product ions, and not fragmented or reacted or fragmented or reacted to a lesser degree, a Multiple Reaction. Monitoring ("MRM") mode of operation, a Data Dependent Analysis ("DDA") mode of operation, a Data Independent Analysis ("DIA") mode of operation, a Quantification mode of operation or an Ion Mobility Spectrometry ("IMS") mode of operation.

BRIEF DESCRIPTION OF THE DRAWINGS

Various embodiments will now be described, by way of example only, and with reference to the accompanying drawings in which.

DETAILED DESCRIPTION

Figure 1A:
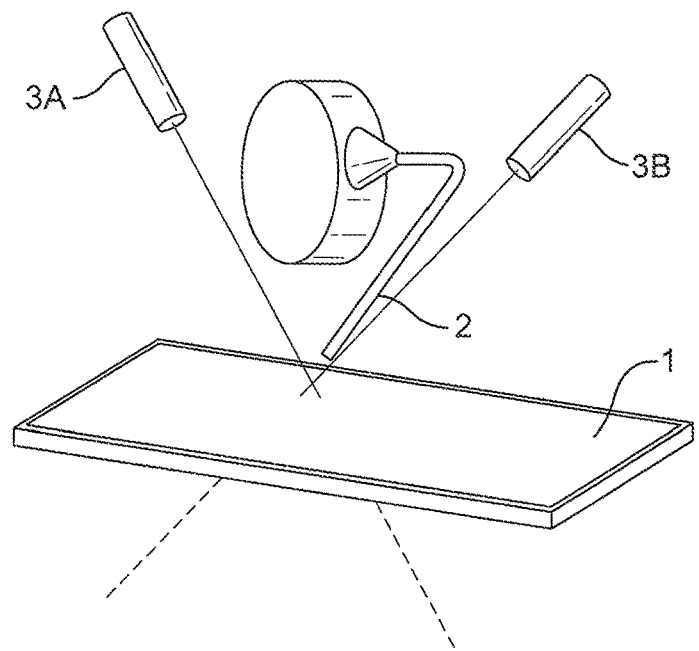
FIG. 1A shows an example of a technique for indicating whether a sample is positioned at the correct height relative to a sampling capillary and shows the case where the sample is positioned incorrectly and FIG. 1B shows a technique for indicating whether a sample is positioned at the correct height relative to a sampling capillary and shows the case where the sample is positioned correctly.

In ion analysis instruments such as mass spectrometers or ion mobility spectrometers it is important to ensure that the sample and the stream of ions generated from the sample are correctly aligned with the inlet to the instrument such that the sample may be efficiently analysed. For instance, the position and height of the sample to be analysed relative to the sampling orifice should ideally be optimised to ensure that a sufficient number of analyte ions are provided through the orifice to the analyser. Likewise, the position and orientation of the components of the ion source relative to the sample surface may be optimised to ensure that ions of interest are efficiently generated.

By way of example, in the case of desorption electrospray ionisation ("DESI") or laser-assisted electrospray ionisation ("LAESI") it is necessary to carefully arrange the electrospray emitter relative to the sample surface and the sampling orifice.

As another example, for the cases of inductively-coupled plasma ("ICP") or Direct Analysis in Real Time ("DART") ionisation it is necessary to ensure a correct positioning of the plasma torch. A further example would be laser desorption ionisation ("LDI") or matrix-assisted laser desorption ionisation ("MALDI") where it is important to correctly position the laser beam relative to the sample. A skilled person will appreciate that the techniques described herein can be extended to any suitable ionisation techniques requiring a critical arrangement of the sample, the ion source and/or the sampling orifice. This is particularly the case for many ambient ionisation techniques, where the ion source and sample are situated outside of the instrument i.e. on the other side of the sampling orifice to the analyser (which is typically disposed within a high vacuum region).

However, the process of changing the sample under analysis, fitting the appropriate sampling orifice or changing the ionisation source may result in the critical alignment of these components being lost. Their relative positions must then be subsequently re-optimised which can be a laborious and time-consuming process. Furthermore, sample may be lost or contaminated during this time.

The techniques described herein relate to the use of an indicator device for providing an indication that defines a correct positioning of the ion source assembly components and aids this re-adjustment.

The device for providing an indication may generally provide an indication of a relative positioning of any or all of the ion source, the sample and the sampling orifice or capillary. Generally, the indication will be an indication of a relative positioning between two or more of these components, i.e. between the ion source and the sample, between the ion source and the sampling orifice or capillary, or between the sampling orifice or capillary and the sample. However, the indication may also indicate a positioning of the sample, ion source and/or sampling orifice relative to any other components of the ion analysis instrument or relative to any other indicators or markers, including e.g. a fixed reference point.

An indication may be provided for each pair of components that are to be aligned e.g. there may be device for providing an indication of a relative positioning of the ion source relative to the sample and a further device for providing an indication of a relative positioning of the sampling capillary relative to the sample. That is, one or more or a plurality of indications may be provided. There may be a plurality of devices for providing such plurality of indications. However, it will also be appreciated that single device, or a single indication, may serve to indicate a relative positioning of multiple different components. The one or more devices for providing the indication may be fixed in position relative to their associated component e.g. relative to the ion source and/or sampling capillary. Generally, the device for providing an indication may be associated with or mounted on either the ion source assembly or the ion analysis instrument as appropriate.

The indicator device comprises one or more sources of electromagnetic radiation. The source of radiation may provide a visual (i.e. visible) indication, or may provide a non-visible (e.g. infra-red or ultraviolet) indication. Where the indicator device provides a visual indication, the indication may serve as a visual aid for aligning the components into a desired relative position. Using a source of electromagnetic radiation, such as one or more lasers or image projection devices, may thus provide a visual indication that allows a user to rapidly, manually adjust the positioning of the various components into a desired position. Alternatively, by providing a suitable detector and control system, an indication provided by a source of electromagnetic radiation (whether in the visible or non-visible range of the spectrum) may be used to facilitate an automatic (re)alignment of components. The indicator device may further comprise various suitable optical devices for directing and/or focussing the electromagnetic radiation to help provide the indication.

As one example, the indicator device may comprise one or more lasers or one or more pairs or groups of lasers. Particularly, the indicator device may comprise a number of independent pairs of lasers, with each pair of lasers arranged so as to provide one or more indications of a desired relative positioning of one or more of the components. Where the indicator device comprises one or more lasers, an indication may be provided for example by the distance between two laser spots or by a crosshair formed by two laser lines. Thus, in embodiments, the indicator device may comprise a pair of laser point sources and/or a pair of laser line sources. The pairs of lasers may be arranged to indicate or define the relative positions of the ion source, sample and/or sampling orifice. In particular, the pairs of lasers may be arranged such that a desired relative position of the ion source, sample and/or sampling orifice is indicated.

As another example, the optical device may comprise an image projection device. The image projection device may be arranged to project one or more indications, e.g. lines or spots in a similar manner described above. For instance, a cross hair may be formed by two projected lines. A desired or pre-determined relative positioning between any two components may be indicated by a point of focus and/or a point of intersection of the lasers or image projection devices. In embodiments, the indicator device may comprise a device for indicating a height of the sample relative to the sampling orifice or capillary and/or relative to the ion source. The indicator device may additionally or alternatively comprise a device for indicating a positioning or alignment of the ion source relative to the sample and/or relative to the sampling orifice or capillary. The indicator device may additionally or alternatively comprise for indicating a positioning or alignment of the sampling orifice or capillary relative to the sample.

It will be appreciated that a single device, e.g. a single pair of lasers, may provide an indication of both a height and also of an orientation of a particular component. Generally, as mentioned above, a plurality of indications will be provided in order to indicate the positioning or desired positioning of a plurality of components. The device for providing an indication may thus comprise a first device that provides a first indication of a height of the sample relative to the sampling orifice. The first device or first indication may additionally indicate the position or orientation of the sampling orifice relative to the surface of the sample. The device for providing an indication may further comprise a second device that provides a second indication of the position or orientation of ion source relative to the surface of the sample i.e. on the surface of the sample. The second device may optionally also provide an indication of a height of the sample relative to the ion source.

These indications may also be used to determine a desired relative position between the ion source and the sampling orifice e.g. such that they are both directed towards the same point on the surface of the sample. The indication of the position or alignment of the ionisation device relative to the sample and the indication of the position or alignment of the sampling orifice relative to the sample may thus be aligned with one another (and/or e.g. with a further reference indication).

By way of example, the device for indicating a height of the sample (i.e. of a surface of the sample or of a sample holder or plate) relative to the sampling orifice or capillary and/or ion source or ionisation device may comprise two point source lasers. The two point source lasers will provide two spots on the surface of the sample. The point of intersection of the beams of the point source lasers (i.e. where the two spots align) may be set to indicate the desired height.

Similarly, where a laser beam is focussed onto the sample, the laser spot size may be used to indicate the correct focussing and hence the correct height of the sample relative to the sampling orifice or capillary and/or ion source.

Two point source lasers may also be used to indicate a positioning or alignment (of e.g. the sampling orifice) relative to the sample surface. For instance, by arranging the lasers in the same plane as a sampling capillary, the point of intersection will also indicate the point on the sample surface to which the sampling capillary is directed.

As another example, the device for indicating a positioning or alignment (e.g. of the ionisation device relative to the sample and/or relative to the sampling orifice) may comprise two line source lasers arranged to provide a crosshair on the surface of the sample. The crosshair may indicate the point on the surface of the sample to which the ionisation device is directed.

The point of intersection indicating the point on the sample surface to which the sampling capillary is directed towards and the crosshair indicating the point on the surface of the sample to which the ionisation device or sampling orifice or capillary is directed towards can then be aligned with one another (e.g, by moving the ionisation device and/or sample and/or sampling capillary) such that the sampling capillary and ion source are directed towards the same point of the surface of the sample.

Similarly, where an image projection device is used, the degree of focus of the projected image(s) may be used to provide an indication of the height or the sample relative to the sampling orifice and/or the ion source. For instance, the image projection device may be configured such that the image is correctly focussed when the sample is positioned at the correct i.e. a predetermined desired height.

Any combination of the above indications and indeed other suitable indications may be provided in respect of any of the components described above. For instance, point source lasers may also be used to indicate the positioning of the sampling capillary and/or line source lasers may also be used to indicate the positioning of the ion source or ionisation device.

Figure 1B:
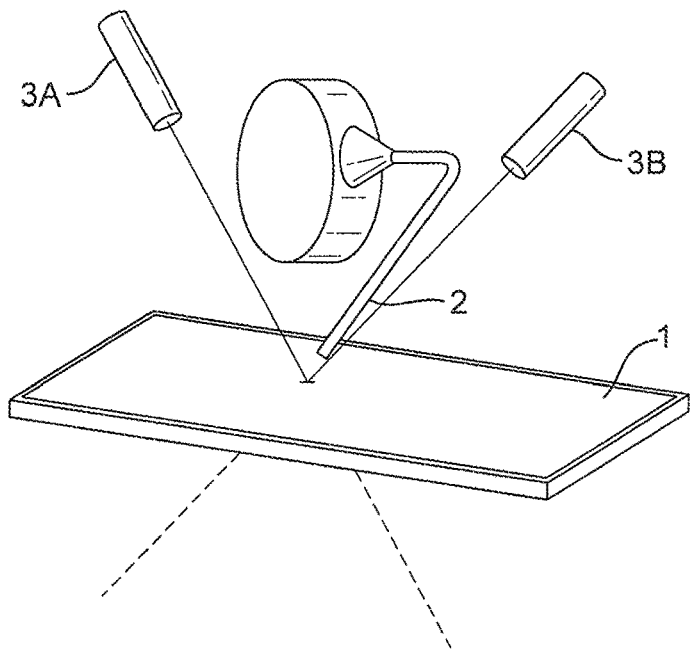

FIGS. 1A and 1B illustrate one example of a technique for determining or indicating a correct height of a sample 1 relative to a sampling capillary 2 using a pair of point-source lasers 3A,3B. FIG. 1A illustrates the case where the sample 1 is positioned incorrectly, i.e. too low, relative to the capillary 2, FIG. 1B illustrates the case where the sample 1 is at the correct height.

The positions of the pair of laser pointers 3A,3B may be set to define the correct sample height, which may be determined from an initial optimisation process. The two laser beams may be arranged to intersect at the optimum height between the sample 1 and the sampling capillary 2. Furthermore, by ensuring that the two laser pointers 3A,3B are in the same plane as the sampling capillary 2, the point at which the lasers intersect also defines the point on the sample 1 to which the capillary 2 is directed. The laser beams thus provide a visual aid which facilitates rapid adjustment of the height of the sample 1 to the correct position.

Figure 2A:
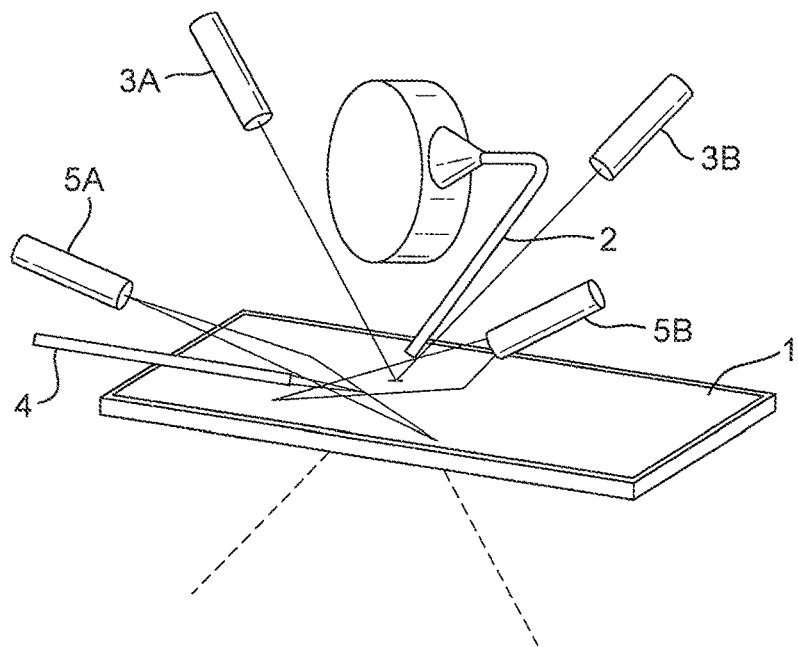
FIG. 2A shows an example of a further technique for indicating whether an electrospray device is correctly oriented relative to the sample surface and illustrates the case where the electrospray device is out of position and FIG. 2B shows a further technique for indicating whether an electrospray device is correctly oriented relative to the sample surface and illustrates the case where the electrospray device is in the correct position.
Figure 2B:
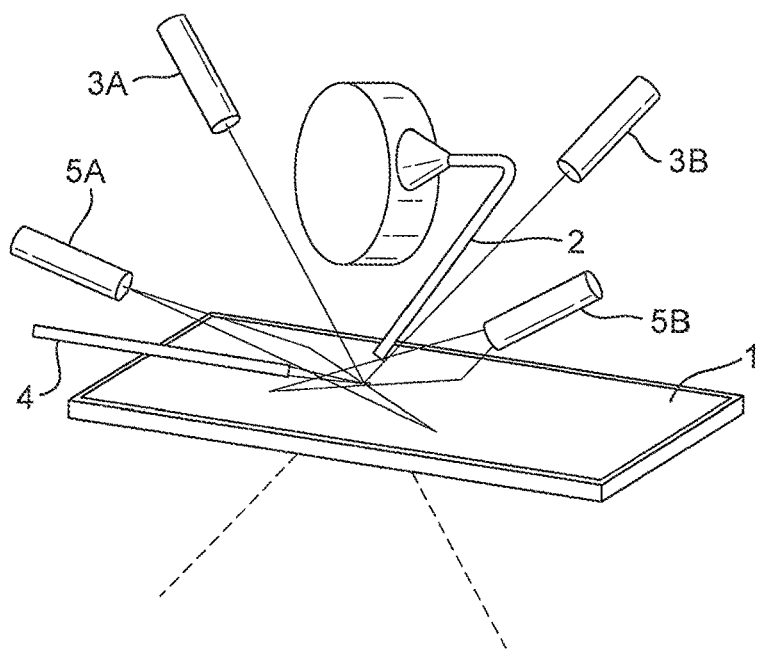

FIGS. 2A and 2B illustrate an example of a technique for indicating a correct alignment of an electrospray emitter 4 relative to the sample surface 1. FIG. 2A illustrates the case where the sprayer 4 is out of position. FIG. 2B illustrates a correct positioning.

In the embodiment shown in FIGS. 2A and 2B a pair of laser line generators 5A,5B is used to produce a crosshair on the surface of the sample plate 1. Again, this provides a visual aid allowing the height and alignment of the sprayer 4 to be readily set to the correct position. By ensuring that the two planes defined by the laser line generators 5A,5B intersect along the direction of the sprayer 4, the crosshairs formed on the sample surface 1 will always indicate the point at which the spray impinges on the sample surface 1.

As shown in FIGS. 2A and 2B, the pair of laser line generators 5A,5B may be combined with the laser pointers 3A,3B of FIGS. 1A and 1B to allow the optimum configuration of all of the components to be set visually. In particular, the sample surface 1 can be readily set to the correct height relative to the sprayer 4 and sampling capillary 2, and the orientations of the sprayer 4 and sampling capillary 2 can be set such that they are both directed towards the same point of the sample surface 1.

Although FIGS. 2A and 2B relate to the example of electrospray ionisation, it will be appreciated that the techniques may equally be extended to various other ionisation sources to ensure correct positioning or re-positioning e.g. after a change in components. For example, the ion source may comprise various other ambient pressure ionisation sources such as a desorption electrospray ionisation ("DESI") source, a laser-assisted electrospray ionisation ("LAESI") source, an inductively coupled plasma ("ICP") source, a Direct Analysis in Real Time ("DART") ionisation source, a laser desorption ionisation ("LDI") source, a matrix-assisted laser desorption ionisation ("MALDI") source or a Dielectric Barrier Discharge ion source. In general, the ionisation source may comprise an ionisation device arranged such that an ionising beam is directed in use towards the sample wherein impact of the ionising beam on the sample causes ions to be generated from the sample. For example, the ionisation device may comprise: (i) an electrospray emitter; (ii) a plasma torch; (iii) a focussed laser beam; and (iv) a jet of fluid. It will be appreciated that where the ion source comprises a laser beam, for example, this is typically a different laser beam to that of the indicator device, where the indicator device comprises one or more lasers.

The laser indicator devices illustrated in FIGS. 1A-B and FIGS. 2A-B provide a visual aid indicating the correct positioning of the sample 1, sprayer 4, etc. This may allow a user to quickly manually adjust the relative positions of these components to the correct positioning following a misalignment (e.g. due to a sample change). However, it is also contemplated that an automatic alignment may be performed. For instance, embodiments are contemplated comprising a machine vision camera (not shown) with a feedback loop to a set of motorised actuators to allow the components to be returned to their optimum configuration automatically.

It will also be appreciated that an indication need not be provided by a laser, and that other suitable devices for indicating a correct position will be apparent to a skilled person, including, for example, other optical devices such as an image projection system, as described above. It is also contemplated, for instance, that a camera or detector may be provided as part of the indicator device where the camera or detector is sensitive to some other indication, e.g. non-visible radiation.

Although the present invention has been described with reference to various embodiments, it will be understood by those skilled in the art that various changes in form and detail may be made without departing from the scope of the invention as set forth in the accompanying claims.

The invention claimed is:

1. An ion analysis instrument comprising:
   an ion source for generating ions from a sample;
   a sampling orifice or capillary for receiving ions generated by said ion source through which ions pass, in use, towards an analyser; and
   an indicator device comprising two or more sources of electromagnetic radiation that each provide one or more distinctive marks that give an indication of a positioning of the ion source and/or the sampling orifice or capillary relative to the sample, wherein the indicator device is configured such that a desired positioning is indicated by a point of intersection between the distinctive marks provided by the two or more sources of electromagnetic radiation.

2. An instrument as claimed in claim 1, wherein said indicator device comprises one or more pairs or groups of lasers and/or one or more image projection devices.

3. An instrument as claimed in claim 1, wherein said indication comprises an indication of a height of said sample relative to said sampling orifice or capillary and/or relative to said ion source.

4. An instrument as claimed in claim 1, wherein said indicator device comprises a device for indicating a positioning or alignment of said ion source relative to said sample and/or relative to said sampling orifice or capillary.

5. An instrument as claimed in claim 1, wherein said indicator device comprises a device for indicating a positioning or alignment of the sampling orifice or capillary relative to the sample.

6. An instrument as claimed in claim 1, wherein at least one of said ion source, said sample and said sampling orifice or capillary is replaceable and/or adjustable between a range of positions in use, and wherein said indicator device is arranged to provide an indication of a desired or predetermined relative positioning of said ion source and/or said sample and/or said sampling orifice or capillary.

7. An instrument as claimed in claim 1, further comprising a device for detecting said indication and control circuitry for automatically adjusting the position of said sample and/or said ion source based on said indication.

8. An instrument as claimed in claim 1, wherein said ion source comprises an ionising beam which is directed, in use, onto said sample in order to generate ions.

9. An instrument as claimed in claim 1, wherein said ion source comprises an ambient or atmospheric pressure ion source.

10. A method of aligning one or more components of an ion analysis instrument comprising:
    providing an ion analysis instrument as claimed in claim 1; and
    adjusting the position of one or more of the ion source, the sample and the sampling orifice or capillary until the indicator device indicates a desired relative positioning.

11. A method as claimed in claim 10, comprising:
    determining a desired relative positioning of said sample, said ion source and/or said sampling orifice or capillary; and
    generating an indication reflective of said desired positioning.

12. A method as claimed in claim 10, wherein the step of adjusting the position of said sample and/or said device for generating ions and/or said sampling orifice or capillary comprises:

(i) adjusting a height of said sample relative to said ion source and/or said sampling orifice or capillary; and/or
(ii) adjusting an orientation or alignment of said device for generating ions and/or said sampling orifice or capillary relative to a surface of said sample.

13. A mass spectrometer comprising:
an ion source for generating ions from a sample;
a sampling orifice or capillary for receiving ions generated by said ion source through which ions pass, in use, towards a mass analyser;
an indicator device for providing an indication of a height of said ion source and/or said sampling orifice or capillary relative to said sample, wherein the indication comprises one or more distinctive mark(s) provided by a source of electromagnetic radiation, and wherein the indicator device is configured such that a desired positioning is indicated by a point of focus of the one or more distinctive mark(s);
a first device for providing a first indication of a relative positioning of said ionisation device and said sample or sample plate; and
a second device for providing a second indication of a relative positioning of said sampling orifice or capillary and said sample or sample plate;
wherein said first device and said second device each comprise a pair of point or line source lasers.

14. A mass spectrometer comprising:
an ion source for generating ions from a sample;
a sampling orifice or capillary for receiving ions generated by said ion source through which ions pass, in use, towards a mass analyser;
a first device for providing a first indication of a relative positioning of the ion source and the sample or sample plate; and
a second device for providing a second indication of a relative positioning of the sampling orifice or capillary and the sample or sample plate,
wherein the first device and second device each comprise a pair of point or line source lasers.

* * * * *